(12) United States Patent
Lange et al.

(10) Patent No.: US 7,746,097 B2
(45) Date of Patent: Jun. 29, 2010

(54) TRANSCEIVER HAVING AN ADJUSTABLE TERMINATING NETWORK FOR A CONTROL DEVICE

(75) Inventors: Klaus Lange, Braunschweig (DE); Carsten Schanze, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 230 days.

(21) Appl. No.: 11/884,409

(22) PCT Filed: Dec. 2, 2005

(86) PCT No.: PCT/EP2005/013052
§ 371 (c)(1),
(2), (4) Date: Oct. 12, 2007

(87) PCT Pub. No.: WO2006/089573
PCT Pub. Date: Aug. 31, 2006

(65) Prior Publication Data
US 2009/0160479 A1 Jun. 25, 2009

(30) Foreign Application Priority Data
Feb. 24, 2005 (DE) .................. 10 2005 009 491

(51) Int. Cl.
*H03K 19/003* (2006.01)
*H03K 17/16* (2006.01)
(52) U.S. Cl. ........................................ 326/30; 326/82
(58) Field of Classification Search .............. 326/30, 326/82, 83, 26, 27, 89
See application file for complete search history.

(56) References Cited
U.S. PATENT DOCUMENTS
4,719,369 A    1/1988  Asano et al.

5,134,311 A    7/1992  Biber et al.
5,448,180 A    9/1995  Kienzler et al.
5,553,250 A *  9/1996  Miyagawa et al. .......... 710/100
2002/0130680 A1* 9/2002  Meyer et al. .................. 326/30

FOREIGN PATENT DOCUMENTS

| CN | 1466816 | 1/2004 |
|---|---|---|
| DE | 36 27 681 | 2/1987 |
| DE | 41 42 081 | 7/1992 |
| DE | 197 25 917 | 1/1999 |
| DE | 198 54 117 | 5/2000 |
| DE | 100 20 142 | 11/2001 |
| DE | 103 41 514 | 4/2005 |
| EP | 0 463 316 | 1/1992 |
| EP | 0 576 444 | 1/1994 |
| GB | 2 254 227 | 9/1992 |
| WO | WO 02/27930 | 4/2002 |

OTHER PUBLICATIONS

International Search Report, PCT International Patent Application No. PCT/EP2005/013052, dated Mar. 17, 2006.
International Preliminary Report on Patentability and Written Opinion, PCT International Patent Application No. PCT/EP2005/013052, dated Sep. 11, 2007 (English translation).

* cited by examiner

*Primary Examiner*—Daniel D Chang
(74) *Attorney, Agent, or Firm*—Kenyon & Kenyon LLP

(57) ABSTRACT

In a transceiver for a control unit having a transceiver core for adapting the level of messages received or to be sent, an adjustable terminating network is situated in the transceiver that makes it possible to adjust at least two connection resistance values, the terminating network and the transceiver core being monolithically integrated in a semiconductor circuit.

11 Claims, 1 Drawing Sheet

TRANSCEIVER HAVING AN ADJUSTABLE TERMINATING NETWORK FOR A CONTROL DEVICE

FIELD OF THE INVENTION

The present invention relates to a transceiver for a control unit.

BACKGROUND INFORMATION

It is conventional that a plurality of function modules may be provided in a motor vehicle, where they are allocated to engine management or vehicle body electronics, for example, and special vehicle equipment such as a radio, car phone or navigation system. It is also conventional that the individual function modules may be connected to a bus system, e.g., a CAN bus, for data exchange and for triggering, and a separate bus may be provided for each of the groups indicated above. The bus systems may be interconnected via a gateway for exchanging data and control commands. The function modules that require a high-speed data exchange, e.g., the control units for the engine and transmission, as well as other components that are required for functionality and safety, are preferably connected to a so-called high-speed bus, and the less time-critical components, e.g., those that support special equipment, are connected to a so-called low-speed bus or comfort bus.

The function modules and/or control units include a controller and a transceiver, the main task of the transceiver being to create a physical interface with the bus system. The level of the messages received and/or to be sent is adjusted in the transceiver.

Since transmission rates in the bus systems are relatively high, reflection at the transition points must be reduced. In principle two different approaches are conventional.

In decentralized termination, a terminating resistor whose resistance is equal to the characteristic impedance of the bus line is provided on both ends of the bus system, the two characteristic impedances being provided in the last control units at the end of the bus system. A typical value for the characteristic impedance is 120Ω for a twisted double line, for example. One problem with decentralized termination is that the design is not always known in advance. It is therefore also not known where the end of the bus system is located. In addition, with a star-shaped bus structure, there is no clearly discernible beginning and end.

Therefore, centralized termination is an alternative to decentralized termination. In centralized termination, the termination occurs centrally, e.g., in a control unit, typically with half the characteristic impedance being chosen as the terminating resistance. This is a reasonable compromise to minimize reflections centrally.

The two concepts for termination have in common that the control units not involved in termination of the bus system are terminated using the highest possible resistance, e.g., in the kiloohm range.

The particular terminating resistors are provided together with elements of a supporting network and/or filters that may be necessary as discrete components on the transceiver. Owing to the fact that a central control unit may be a component of a centralized or decentralized termination or may not contribute to termination at all, the terminating resistor must be adapted, depending on the bus structure. This may be accomplished manually by replacing the resistors, or the same control unit may be manufactured in three variants having different terminating resistors, which is very complex and expensive.

German Published Patent Application No. 198 54 117 describes a circuit arrangement for communication with a plurality of electric components in a motor vehicle, including at least one bus for transmission of data between the components connected via network nodes and at least one terminating resistor, the at least one terminating resistor having an adjustable resistance value. The resistance of the terminating resistor may be adjusted electronically and is designed as a digital potentiometer, for example. In addition, it is proposed that all network nodes be allocated an adjustable terminating resistor. Depending on the type of adjustable resistors used, the adaptation of the total resistance may be accomplished in various manners. In an exemplary embodiment, one of the network nodes analyzes the status messages of the other network nodes connected to the bus and automatically adjusts the resistance of its terminating resistor. The adjustment may also be accomplished automatically by an internal control unit on the bus which measures the total resistance and then adjusts the terminating resistances of all bus devices. Finally, the adjustment may also be performed by an external diagnostic device connected to the bus, either at the time of manufacture, e.g., after assembly of all function modules on a bus, or while being serviced in the shop for maintenance or for readjustment after installation or removal of modules. This allows simplifications in manufacturing and in subsequent modifications of motor vehicles, so that only a small number of control unit variants is required. When the adjustable resistors are integrated into the network nodes, separate assembly with terminating resistors is superfluous.

German Published Patent Application No. 100 20 142 describes a bus system including a bus structure to which electric components are connected, an error counter and a terminating resistor being assigned to the components, the terminating resistor being designed to be adjustable and variable as a function of the error density detected by the error counter. The adjustable terminating resistor may be designed as a digital potentiometer and is situated in the electronic component.

SUMMARY

Example embodiments of the present invention provide a transceiver which may simplify termination on a bus system.

The transceiver includes an adjustable terminating network by which at least two termination resistance values are adjustable, the terminating network and the transceiver core being monolithically integrated in a semiconductor circuit. The integration of the terminating network in the transceiver dispenses with separate resistors or potentiometers, which is of interest in particular with regard to cost and reliability because feeder lines are eliminated by the monolithic integration. Furthermore, example embodiments of the present invention utilize the aspect that a relatively continuous adjustment option is often not necessary. Instead, the option of switching between being unterminated and having centralized or decentralized termination is sufficient in most cases, adjustability of all three states, e.g., being provided, such an adjustability between two or three resistance values being very easily integrated into an IC. Furthermore, this greatly simplifies the adjustment. The transceiver needs to be notified only once, e.g., by its assigned controller module, in which function the latter is installed. The controller adjusts the particular resistance value (high resistance, characteristic impedance or half characteristic impedance). The transceiver may include two terminals for connecting to a two-wire bus system such as CAN or Flex Ray.

Two first, second and third terminating resistors may be connected in series between the terminals, the center taps of the series being electrically connected and the second and third terminating resistors being switchable on and/or off. The first two terminating resistors form the high-resistance unterminated terminal, coming into play when the other four resistors are switched off. The other four resistors may have the resistance values of the characteristic impedance of the line. Thus, if the two second terminating resistors are on, the transceiver is terminated with the characteristic impedance of the bus line, so the transceiver acts as a terminator of a decentralized termination. If the two third terminating resistors are also on, the resulting terminating resistor is approximately equal to half the characteristic impedance, so the transceiver acts as a terminator of a centralized termination.

Switches or fuses may be associated with the terminating resistors. An advantage of these switches is the reversible setting of the resulting resistance value, but because of the design as an active component, this requires a permanent power supply to the transceiver module because the set termination resistance should not change. This problem may be solved by using fuses, but then the setting is irreversible.

The switches may be designed as transistors.

A supporting network between the power supply voltage and ground may be integrated into the transceiver. This supporting network is connected to the center tap of the terminating resistors.

A filter may be additionally integrated into the transceiver.

Example embodiments of the present invention are explained in greater detail below with reference to the appended Figures.

DETAILED DESCRIPTION

Figure 1:
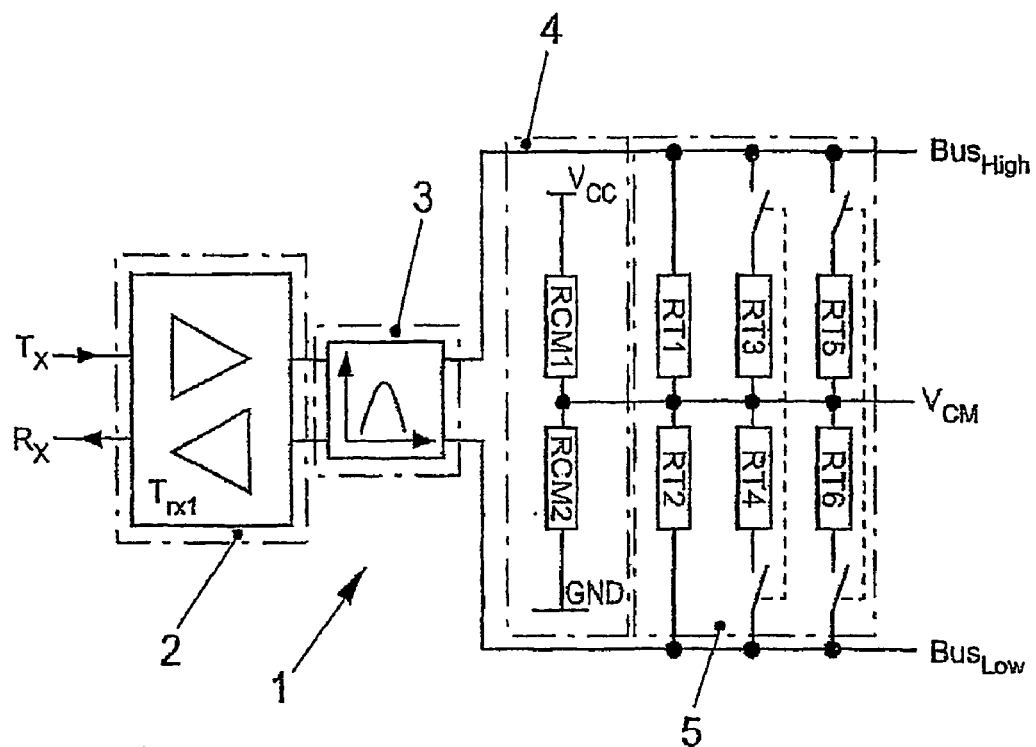
FIG. 1 shows a transceiver having an integrated terminating network with switches.

Transceiver 1 includes a transceiver core 2, a filter 3, a supporting network 4 and a terminating network 5. Terminating network 5 includes two first terminating resistors RT1, RT2 connected in series between two terminals $BUS_{HIGH}$, $BUS_{LOW}$, terminals $BUS_{HIGH}$, $BUS_{LOW}$ forming the interface to the bus lines. Two other terminating resistors RT3, RT4 and two third terminating resistors RT5, RT6 are provided in parallel with the first series connection of RT1, RT2, all the center taps of the series connection being interconnected via a common line $V_{CM}$. In addition, a switch is associated with each terminating resistor RT3-RT6 of the second and third series connections. As indicated by the dashed line between the switches of terminating resistors RT3 and RT4 and/or RT5 and RT6, the switches of a series connection are always switched in the same sense, i.e., both switches are open or both are closed. Supporting network 4 includes two resistors RMC1 and RMC2, which are connected in series and are situated between power supply voltage $V_{CC}$ and ground GND. The center tap of the series connection of RMC1 and RMC2 is connected to line $V_{CM}$. In addition to the resistors described here, supporting network 4 may also include capacitors, although they need not be described in greater detail. The main function of supporting network 4 is to support the recessive voltage level on the bus line. Filter 3 increases the interference resistance in the range of, e.g., 15 to 25 MHz. The function of terminating network 5 is to adjust the suitable terminating resistance value, depending on the wiring of the transceiver, if necessary. The following cases are to be differentiated, either transceiver 1 is not involved in the adjusted termination of the bus line, or transceiver 1 is part of the decentralized termination or terminates the bus line centrally.

In the first case, the four switches are opened so that terminating resistors RT3-RT6 are uncoupled from terminals $BUS_{HIGH}$, $BUS_{LOW}$. In this case, only two terminating resistors RT1, RT2 which terminate the transceiver with a relatively high resistance with respect to the bus line are active.

In the second case of decentralized termination, the transceiver should terminate the bus with the characteristic impedance. To do so, the switches were closed by terminating resistors RT3, RT4. If the resistance values are RT3=RT4=$Z_L$, the resulting resistance value is approximately equal to characteristic impedance $Z_L$ of the line (disregarding high-resistance voltage divider RT1, RT2).

In the third case, the switches of terminating resistors RT5, RT6, which may also correspond approximately to the characteristic impedance, are also closed. Therefore, half the characteristic impedance is approximately established as the terminating resistance.

The information about which resistance value is to be set may be reported to the transceiver via a switch, for example. Alternatively, the information may also be transmitted to transceiver 1 by the controller module. This information may be reported to the controller module via a switch or a programmable interface.

Filter 3 may include inductances, so that it may be omitted in the integration for reasons of space and manufacturing. Under some circumstances, supporting network 4 need not be integrated into transceiver 1 but instead may be implemented externally by discrete resistances or by hybrid technology.

Figure 2:
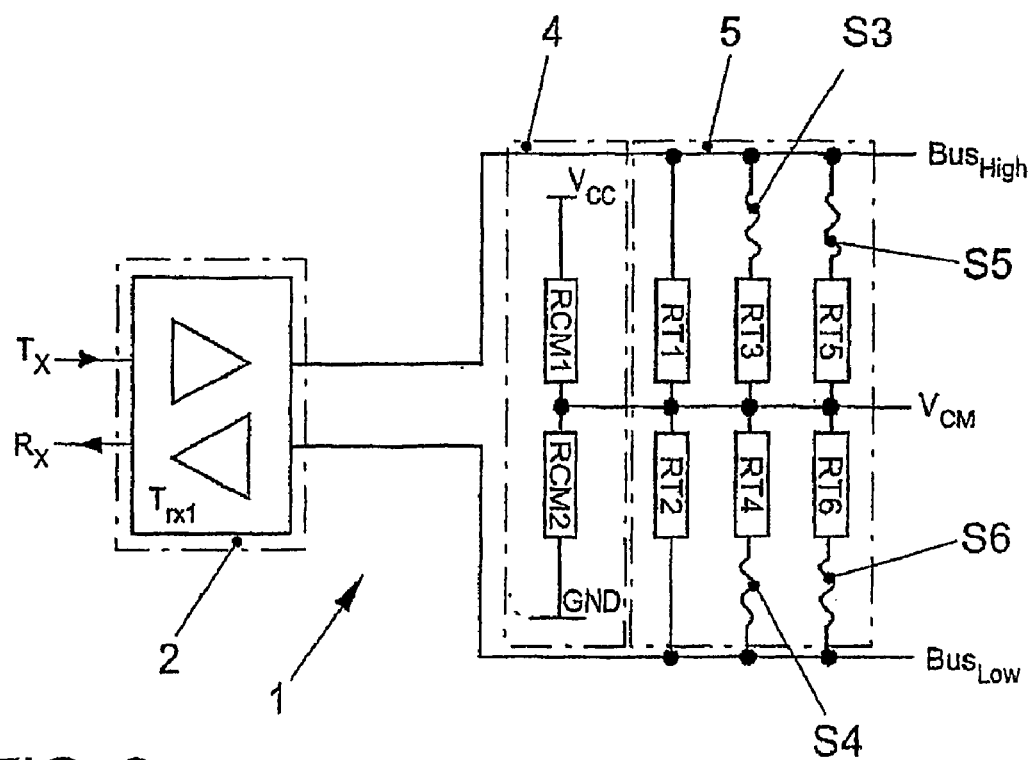
FIG. 2 shows a transceiver having an integrated terminating network with fuses.

FIG. 2 shows an alternative embodiment of a transceiver 1 without a filter, the switches on terminating resistors RT3-RT6 being replaced by fuses S3-S6. Fuses S5 and S6 are dimensioned such that they burn through at even lower current surges than fuses S3 and S4. Depending on the desired application, either all four fuses are triggered (unterminated) or only fuses S5 and S6 are triggered (decentralized termination) or no fuses are triggered (centralized termination). The current surge may be triggered via transceiver core 2 or via the controller module, the particular height or duration being adjusted by a switch.

As an alternative it is also possible for the terminating network to be designed as a separate circuit. In this case, the terminating network may be designed together with the supporting network and/or the filter as a separate module, for example, with the integration, e.g., being accomplished by hybrid technology.

What is claimed is:

1. A transceiver for a control unit, comprising:
    a transceiver core configured to adjust a level of messages at least one of (a) received and (b) to be sent; and
    an adjustable terminating network, at least three terminating resistance values adjustable via the terminating network, the terminating network and the transceiver core monolithically integrated in a semiconductor circuit;
    wherein the at least three terminating resistance values include high resistance, approximately characteristic impedance, and approximately half characteristic impedance.

2. The transceiver according to claim 1, further comprising two terminals configured to connect to a two-wire bus system.

3. The transceiver according to claim 2, wherein two first terminating resistors are connected in series between the terminals, two second terminating resistors are connected in series between the terminals, and two third terminating resistors are connected in series between the terminals, center taps of the series-connected first terminating resistors, the series-connected second terminating resistors and the series-connected third terminating resistors electrically connected together, the second terminating resistors and the third terminating resistors are switchable at least one of (a) on and (b) off.

4. The transceiver according to claim 3, further comprising at least one of (a) switches and (b) fuses associated with the terminating resistors.

5. The transceiver according to claim 4, wherein the switches are arranged as transistors.

6. The transceiver according to claim 3, wherein the two second terminating resistors and the two third terminating resistors include resistance values approximately equal to characteristic impedance.

7. The transceiver according to claim 3, wherein when the two first terminating resistors are switched on, the two second terminating resistors are switched off, and the two third terminating resistors are switched off, the terminating resistance value is high resistance.

8. The transceiver according to claim 3, wherein when the two first terminating resistors are switched on, the two second terminating resistors are switched on, and the two third terminating resistors are switched off, the terminating resistance value is approximately equal to characteristic impedance, such that the transceiver exhibits decentralized termination.

9. The transceiver according to claim 3, wherein when the two first terminating resistors are switched on, the two second terminating resistors are switched on, and the two third terminating resistors are switched on, the terminating resistance value is approximately equal to half characteristic impedance, such that the transceiver exhibits centralized termination.

10. The transceiver according to claim 1, further comprising a supporting network monolithically integrated in the semiconductor circuit with the terminating network and the transceiver core.

11. The transceiver according to claim 1, further comprising a filter monolithically integrated in the semiconductor circuit with the terminating network and the transceiver core.

* * * * *